(12) United States Patent
Sakaue et al.

(10) Patent No.: US 7,014,904 B2
(45) Date of Patent: Mar. 21, 2006

(54) OPTICAL INFORMATION RECORDING MEDIUM AND METHOD FOR MANUFACTURING THE MEDIUM

(75) Inventors: Yoshitaka Sakaue, Hirakata (JP); Ken'ichi Nagata, Nishinomiya (JP); Noboru Yamada, Hirakata (JP); Rie Kojima, Kadoma (JP); Takashi Nishihara, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 98 days.

(21) Appl. No.: 10/847,440

(22) Filed: May 18, 2004

(65) Prior Publication Data
US 2004/0233819 A1 Nov. 25, 2004

(30) Foreign Application Priority Data
May 20, 2003 (JP) ............................. 2003-141798

(51) Int. Cl.
*B32B 3/02* (2006.01)
(52) U.S. Cl. .................. 428/64.1; 428/64.4; 428/64.5; 428/64.6; 430/270.13
(58) Field of Classification Search ............... 428/64.5, 428/64.6; 430/270.13
See application file for complete search history.

(56) References Cited

U.S. PATENT DOCUMENTS

| 5,492,794 | A | * | 2/1996 | Kawanishi et al. ...... 430/273.1 |
| 5,652,036 | A | | 7/1997 | Kobayashi |
| 6,761,950 | B1 | * | 7/2004 | Kojima et al. ............. 428/64.1 |
| 6,841,217 | B1 | * | 1/2005 | Nishihara et al. .......... 428/64.1 |
| 6,858,278 | B1 | * | 2/2005 | Kojima et al. ............. 428/64.1 |
| 6,881,466 | B1 | * | 4/2005 | Kojima et al. ............. 428/64.1 |
| 2001/0016242 | A1 | | 8/2001 | Miyamoto et al. |
| 2001/0023006 | A1 | | 9/2001 | Miyamoto et al. |

FOREIGN PATENT DOCUMENTS

| JP | 2000-36130 | 2/2000 |
| JP | 2003-85824 | 3/2003 |

* cited by examiner

*Primary Examiner*—Elizabeth Mulvaney
(74) *Attorney, Agent, or Firm*—Wenderoth, Lind & Ponack, L.L.P.

(57) ABSTRACT

An optical information recording medium of the invention has at least two information layers. A first information layer (100) disposed at the front side (viewed from a laser incident side) includes at least a reflection layer (3), a recording layer (6) disposed at the laser incident side with respect to the reflection layer (3), for generating a reversible change between an amorphous phase and a crystalline phase that can be detected optically by applying a laser beam, and a dielectric layer (50) disposed between the reflection layer (3) and the recording layer (6). The dielectric layer (50) contains at least Zr, Si and Cr, a ratio of Zr, Si and Cr of the dielectric layer (50) at the reflection layer side is expressed as $Zr:Si:Cr=p:q:r$ ($p+q+r=100$), a ratio of Zr, Si and Cr of the dielectric layer (50) in the vicinity of the interface at the recording layer side is expressed as $Zr:Si:Cr=s:t:u$ ($s+t+u=100$), and $r<u$ or $t<q$.

19 Claims, 5 Drawing Sheets

OPTICAL INFORMATION RECORDING MEDIUM AND METHOD FOR MANUFACTURING THE MEDIUM

BACKGROUND OF THE INVENTION

1. Field of the Invention

The present invention relates to an optical information recording medium that records and reproduces information at high speed and high density using optical means such as a laser beam, and a method for manufacturing the medium.

2. Description of the Prior Art

Techniques for reproducing or recording high-density information using a laser beam are known, and have been commercialized mainly as optical disks.

Optical disks are roughly divided into read only types, write once types and rewritable types. The read only types have been commercialized as compact disks or laser disks, while the write once types and the rewritable types are commercialized as recording media for document files or data files, for example. The rewritable type optical disks include magneto-optical types and phase change types. The phase change optical disk utilizes the phenomenon that a recording layer changes its phase reversibly between an amorphous phase and a crystalline phase (or between one crystalline phase and another crystalline phase) upon application of a laser beam. Namely, when a laser beam is applied, at least one of a refractive index and an attenuation coefficient of a thin film are changed for recording, and the amplitude of transmitted light or reflected light is changed. As a result, a signal is reproduced by detecting the change in amount of the transmitted light or the reflected light that reaches a detection system.

Note that recently a single sided double layer structure has been proposed with a view to increasing record capacity of the optical disk (see Japanese unexamined patent publication No. 2000-036130, for example).

In addition, research and development has been performed which was aimed at commercializing a double layer optical information recording medium that records and reproduces using a blue color laser. According to this technique, a spot size of a laser beam can be reduced by using a laser beam having a wavelength that is shorter than conventional and an objective lens having a numerical aperture (NA) that is larger than conventional, so that information can be recorded at a higher density.

One of the requirements for a single sided multilayer recording medium is that an information layer that is disposed at the incident side of the laser beam, which is used for recording and reproducing information, has as high transmittance as possible. For example, in the case of a single sided double layer recording medium, when a laser beam passes through the information layer disposed at the incident side and reaches the information layer disposed further inside the medium (i.e., the deeper side), intensity of the laser beam may be reduced. Thus, the laser beam with low intensity will be used for recording on and reproducing from the information layer at the deeper side. Therefore, in order to secure sufficient intensity of the laser beam for recording information on the information layer at the deeper side, the information layer and the like on the front side are required to have especially high transmittance. In order to realize such high transmittance for the information layer that includes at least a recording layer and a reflection layer in this order (when viewed from the incident side of the laser beam), a technique has been studied in which a transmittance adjustment layer made of a dielectric is arranged to contact the side of the reflective layer that is opposite to the incident side of the laser beam. In addition, another technique has also been studied in which refractive indexes and attenuation coefficients of the transmittance adjustment layer and the reflection layer are optimized to realize high transmittance.

Note also that it has been proposed to use a material made of $ZrO_2$—$SiO_2$—$Cr_2O_3$ for a dielectric layer that is in contact with the recording layer. For a disk that is required to have a high transmittance, it is essential to make the laser recording layer, which absorbs light and causes reduction in transmittance, as thin as possible. But thinning of the recording layer may cause another problem in that crystallization ability of the recording layer is reduced. As a countermeasure to this problem, a material made of $ZrO_2$—$SiO_2$—$Cr_2O_3$ may be used for the dielectric layer that contacts with the recording layer so that the reduction in crystallization ability of the recording layer can be suppressed.

Figure 5:
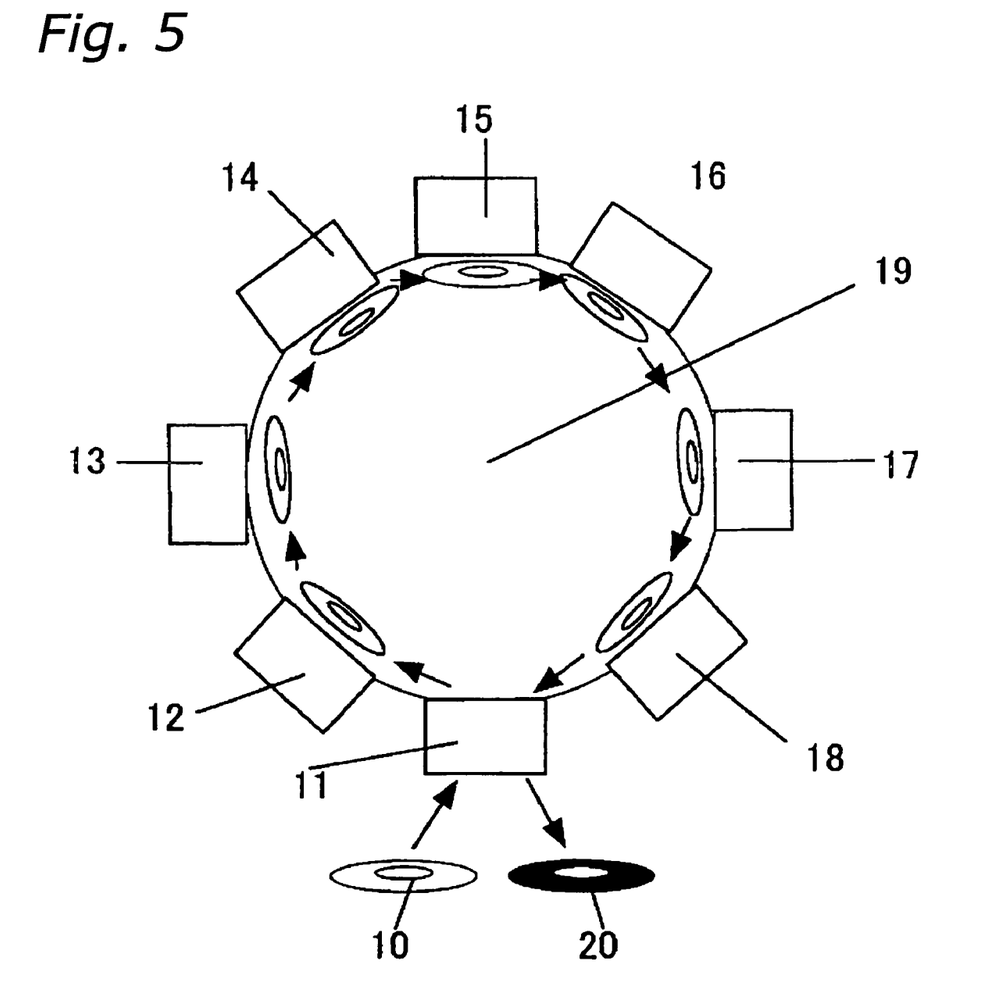
FIG. 5 is a diagram showing a structure of a sheet-fed type sputtering device for manufacturing optical disks.

In addition, many magneto-optical recording media and DVD-RAMs are manufactured in large quantities by using a sheet-fed type sputtering device as a mass production device. In this sheet-fed type sputtering device as shown in FIG. 5, a disk substrate 10 is charged into a vacuum chamber (a main chamber 19) via a load lock chamber 11 and transferred to a film forming chamber to form a first layer (a film forming chamber 12 in this case). The disk substrate 10 is processed in the film forming chamber 12 to form a film, and then transferred to another film forming chamber for the forming of a second layer (a film forming chamber 13 in this case). Here, the film forming process is repeated so that desired layers are formed by the disk substrate 10 being transferred to each film forming chamber. After that, the disk 20 with films formed thereon is taken out via the load lock chamber 11 again. Disk substrates 10 are charged successively via the load lock chamber 11 for mass production.

The inventors of the present invention first worked toward development of a double layer optical information recording medium in order to study a single sided multilayer recording medium. As a material for the dielectric layer, the above-mentioned $ZrO_2$—$SiO_2$—$Cr_2O_3$ was used because it accelerates crystallization, even if the recording layer was made of a thin film.

However, in a mass production study using the above-mentioned sheet-fed type sputtering device having this structure, a problem was found in that peeling of a film can occur easily after a humidity-proof test. As a result of detailed study, it was found that film peeling can occur easily at the interface between the dielectric layer at the recording layer side and the recording layer, at the interface between the dielectric layer at the incident side of the laser beam and the recording layer, and at the interface between the dielectric layer at the reflection layer side and the reflection layer. In addition, it was found that film peeling can occur easiest at the interface between the dielectric layer at the recording layer side and the recording layer. This film peeling can be suppressed by increasing the amount of $Cr_2O_3$ in the material that forms in the dielectric layer. However, the increase in the amount of $Cr_2O_3$ may cause a reduction in transmittance, having a large influence on recording and reproducing characteristics of the information layer that is disposed at the deeper side (when viewed from the incident side of the laser beam). For this reason, it has been found that the material composition of the dielectric layer cannot be changed easily.

In addition, the film forming tact affects the cost of mass production. Therefore, when manufacturing recording media in large quantities using the sheet-fed type sputtering device, it is difficult to perform vacuum discharge with respect to a substrate supplied from the load lock chamber and the load lock chamber itself for a sufficient period of time (vacuum time may be approximately 2–3 seconds, for example). Therefore, moisture from outside of the chamber or that is attached to the substrate can easily enter the film forming chamber. The moisture may deteriorate the corrosion resistance of optical disks to be produced. It has also been found that an optical disk produced by the above-mentioned conventional method has corrosion resistance that is inferior to an optical disk produced by batch type mass production equipment.

As noted above, to realize both the suppression of film peeling and improvement of transmittance, a layer structure of a disk must be optimized as well as the material composition of the dielectric layer.

SUMMARY OF THE INVENTION

A main object of the present invention is to provide an optical information recording medium having a single sided multilayer structure that can suppress the peeling of a film and improve transmittance.

To achieve the above-mentioned object, an optical information recording medium according to the present invention has at least two information layers on a substrate, and the information layer disposed at a laser incident side includes at least a reflection layer, a recording layer and a dielectric layer. The recording layer is disposed at the laser incident side with respect to the reflection layer. The recording layer is for generating a reversible change between an amorphous phase and a crystalline phase that can be optically detected, by applying a laser beam. The dielectric layer contains at least Zr, Si and Cr, and is disposed between the reflection layer and the recording layer. A ratio of Zr, Si and Cr of the dielectric layer at the reflection layer side is described as Zr:Si:Cr=p:q:r (p+q+r=100, and p, q, r are in at %), a ratio of Zr, Si and Cr of the dielectric layer in the vicinity of the interface at the recording layer side is described as Zr:Si:Cr=s:t:u (s+t+u=100, and s, t and u are in at %), and r is less than u.

Here, in the dielectric layer, the ratio of Cr in the vicinity of the interface at the recording layer side is set higher than the ratio of Cr at the reflection layer side. This is so that film peeling at the interface between the dielectric layer and the recording layer can be suppressed, while suppressing decrease in transmittance of the information layer disposed at the laser incident side. Note that the amount of Cr contained in the entire dielectric layer can be approximately equal to the amount contained in a conventional dielectric layer, but it is also possible to decrease it further to improve the transmittance. This is because there is no problem when there is a sufficient amount of Cr in the vicinity of the interface of the dielectric layer at the recording layer side, even if the amount of Cr contained in the entire dielectric layer is decreased.

In addition, it is possible to set a ratio of Si in the dielectric layer in the vicinity of the interface at the recording layer side to be lower than a ratio of Si in the dielectric layer at the reflection layer side. In this case too, film peeling at the interface between the dielectric layer and the recording layer can be suppressed while suppressing the decrease in transmittance of the information layer disposed at the laser incident side.

In addition, when a ratio of Zr, Si and Cr (p+q+r=100, and p, q and r are in at %), (s+t+u=100, s, t and u are in at %) is defined by point A(14:0:86), point B(0:14:86), point C(0:25:75), point D(21:21:58), point E(43:0:57), point F(0:33:67), point G:(33:33:34), point H(67:0:33) and point I(25:0:75), the ratio of Zr, Si, Cr in the material of the dielectric layer in the vicinity of the interface at the recording layer side may be in the range defined by point A, point B, point C, point D, point E and point A in this order, and the ratio of Zr, Si and Cr of the dielectric layer at the reflection layer side may be in the range defined by point C, point F, point G, point H, point I and point C in this order. Note that, it is more preferable if the ratio of Zr, Si and Cr of the dielectric layer at the reflection layer side is in the range defined by point C, point F, point G, point H, point E, point D and point C in this order. In this case too, film peeling at the interface between the dielectric layer and the recording layer can be suppressed while suppressing decrease in transmittance of the information layer disposed at the laser incident side.

In addition, the dielectric layer may have at least two layers including a recording layer side dielectric layer disposed in the vicinity of the recording layer and a reflection layer side dielectric layer that is closer to the reflection layer than the recording layer side dielectric layer.

Also, the dielectric layer that contacts the recording layer may contain $ZrO_2$—$SiO_2$—$Cr_2O_3$, thus making it possible to suppress the decrease of the recording layer's ability to crystallize.

Furthermore, the thickness of the recording layer side dielectric layer may be between 1/15th and 1/3rd of the thickness of the reflection layer side dielectric layer, more preferably smaller than or equal to 1/4th. In addition, the thickness of the recording layer side dielectric layer may be more than or equal to 1 nm and less than or equal to 8 nm, and more preferably more than or equal to 2 nm and less than or equal to 6 nm.

Furthermore, to achieve the above-mentioned object, a method for manufacturing an optical information recording medium having at least two information layers on a substrate includes, for the purpose of forming an information layer that is disposed at a laser incident side, forming at least a reflection layer, forming a recording layer, and forming a dielectric layer between the reflection layer and the recording layer. The recording layer is disposed at the laser incident side with respect to the reflection layer. The recording layer is for generating a reversible change between an amorphous phase and a crystalline phase that can be detected optically, by applying a laser beam. Forming the dielectric layer includes forming at least two layers including a recording layer side dielectric layer having a portion which contacts with the recording layer and a reflection layer side dielectric layer that is closer to the reflection layer than the recording layer side dielectric layer. The reflection layer side dielectric layer contains at least Zr, Si and Cr, whose ratio is described as Zr:Si:Cr=p:q:r (p+q+r=100, and p, q and r are in at %), and the recording layer side dielectric layer contains at least Zr, Si and Cr, whose ratio is described as Zr:Si:Cr=s:t:u (s+t+u=100, and s, t and u are in at %). A sputtering target that satisfies r<u is used.

The ratio of Cr in the recording layer side dielectric layer is made higher than the ratio of Cr in the reflection layer side dielectric layer in the manufacturing process. Thus, film peeling at the interface between the dielectric layer and recording layer can be suppressed while suppressing decrease in transmittance of the information layer at the laser incident side in manufacturing an optical information recording medium.

In addition, it is possible to make the ratio of Si in the recording layer side dielectric layer lower than the ratio of Si in the reflection layer side dielectric layer in the manufacturing process. In this case too, film peeling at the interface between the dielectric layer and the recording layer can be suppressed while suppressing decrease in transmittance of the information layer disposed at the laser incident side in manufacturing an optical information recording medium.

In addition, a material of the dielectric layer may be produced so that when a ratio of Zr, Si and Cr (p+q+r=100, and p, q and r are in at %), (s+t+u=100, s, t and u are in at %) is defined by point A(14:0:86), point B(0:14:86), point C(0:25:75), point D(21:21:58), point E(43:0:57), point F(0:33:67), point G: (33:33:34), point H(67:0:33) and point I(25:0:75), the ratio of Zr, Si and Cr in the recording layer side dielectric layer may be in the range defined by point A, point B, point C, point D, point E and point A in this order, and the ratio of Zr, Si and Cr in the reflection layer side dielectric layer is in the range defined by point C, point F, point G, point H, point I and point C in this order. Note that, it is more preferable if the ratio of Zr, Si and Cr of the dielectric layer at the reflection layer side is in the range defined by point C, point F, point G, point H, point E, point D and point C in this order. In this case too, film peeling at the interface between the dielectric layer and the recording layer can be suppressed while suppressing decrease in transmittance of the information layer disposed at the laser incident side.

Note that, it is also possible to suppress a decrease of the crystallization ability of the recording layer by sputtering a material containing $ZrO_2$—$SiO_2$—$Cr_2O_3$ as a material that contacts with the recording layer.

As described above, Cr in the dielectric layer is necessary for securing corrosion resistance, but may cause decrease in transmittance. However, according to the optical information recording medium and the method for manufacturing the medium of the present invention, the amount of Cr in the vicinity of the interface with the recording layer is increased relatively, so that corrosion resistance can be secured. Thus, good transmittance can be maintained while suppressing an absolute amount of Cr necessary for securing corrosion resistance. Thus, a single sided double layer information recording medium that is superior in recording and reproducing characteristics can be realized by ensuring good corrosion resistance (reliability) and good transmittance.

DESCRIPTION OF THE PREFERRED EMBODIMENTS

Hereinafter, the present invention will be described with reference to the figures.

Figure 1:
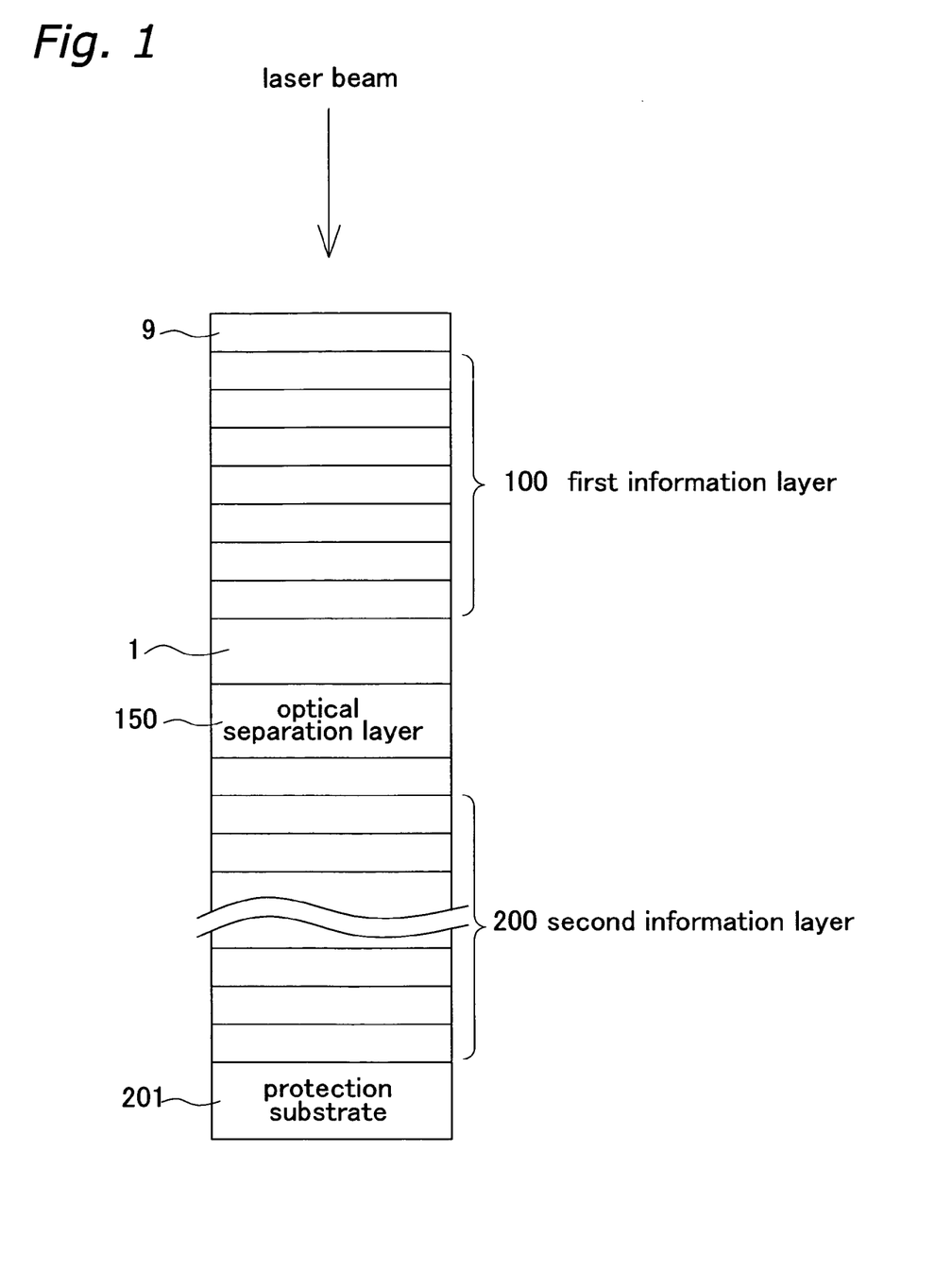
FIG. 1 is a diagram showing a structure of a double layer optical disk that is used in an embodiment of the present invention.

The present invention relates to a single sided double layer disk including two information layers that are a first information layer 100 and a second information layer 200, as shown in FIG. 1. The second information layer 200 is formed on a protection substrate 201. The first information layer 100 is formed on the substrate 1, and an optical separation layer 150 is disposed between the substrate 1 and the second information layer 200. A cover layer 9 is formed on the first information layer 100 at the incident side of a laser beam. Note that the present invention can be applied not only to a recording medium having two information layers but also to a multilayer information recording medium having three or more information layers. Furthermore, the present invention can be applied not only to a recording medium having a plurality of information layers disposed at one side but also to a recording medium having a plurality of information layers disposed at both sides.

Figure 2:
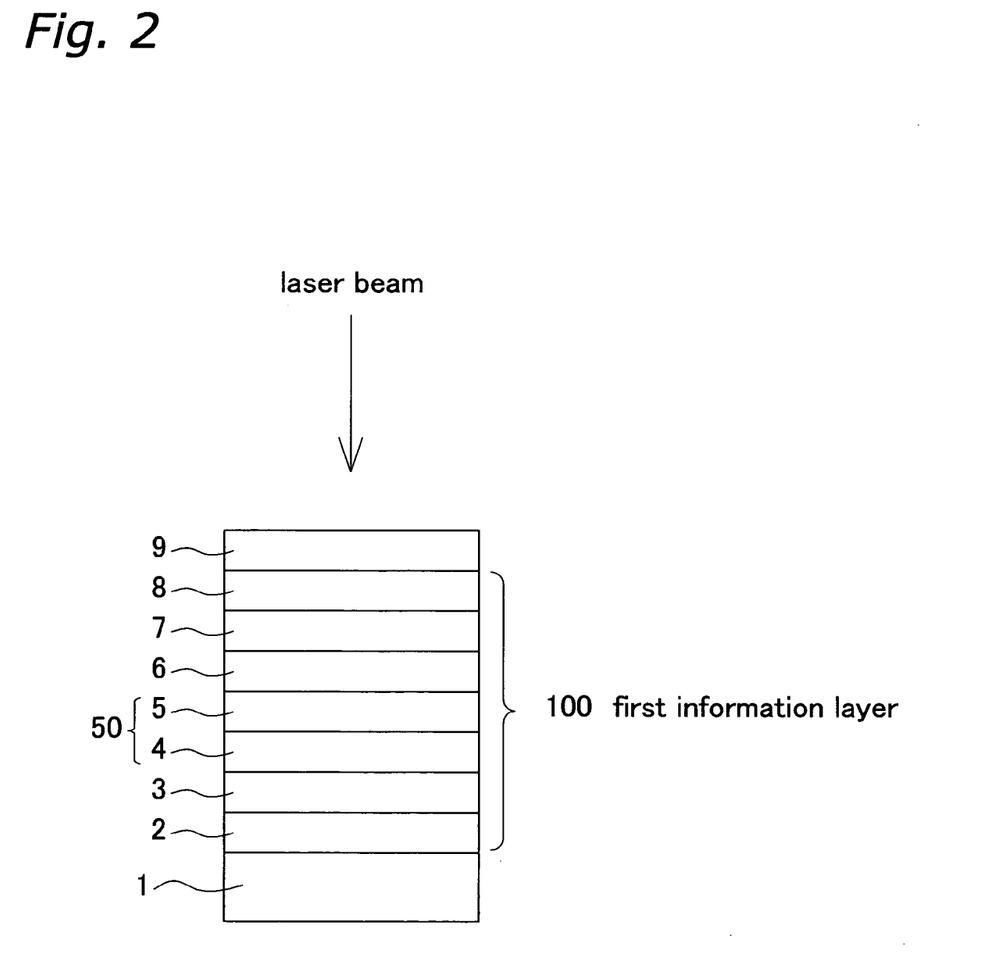
FIG. 2 is a diagram showing a structure of a first information layer of the double layer optical disk that is used in the embodiment of the present invention.

Hereinafter, the first information layer 100 (the information layer at the laser incident side) to which the present invention is applied will be described with reference to FIG. 2.

The first information layer 100 is formed on the substrate 1 as described above. The substrate 1 is a plate made of a resin such as polycarbonate, PMMA or the like, or a glass. It is possible to employ a 2P method which uses a UV resin to transfer the grooves of a stamper substrate to form the grooves of the information layer 100 on the optical separation layer 150.

The first information layer 100 includes at least a transmittance adjustment layer 2, a reflection layer 3, a dielectric layer 50 consisting of a reflection layer side dielectric layer 4 and a recording layer side dielectric layer 5, a recording layer 6, a dielectric layer 7 and a dielectric layer 8, which are disposed in this order from the substrate 1 side.

The transmittance adjustment layer 2 employs titanium oxide because a material having large refractive index for the wavelength of the laser that is used for recording information will enable transmittance to be high.

The reflection layer 3 can be made of a material whose main component is a metal element such as Ag, Au, Al, or the like. In addition, two or more types of protection layers having different refractive indexes may be laminated instead of the metal reflection layer, so that the same optical characteristics as a non-transparent layer can be obtained. In this embodiment, a metal reflection layer made of a metal whose main component is Ag is used.

The dielectric layers 4–5 and 7–8 can be made of a material whose main component is an oxide of Al, Si, Ta, Mo, W, Zr or the like, a sulphide of Zn or the like, a nitride of Al, B, Ge, Si, Ti, Or, or a fluoride of Pb, Mg, La or the like. In this embodiment, the dielectric layer 8 is made of ZnS-20 mol % $SiO_2$, and the reflection layer side dielectric layer 4, the recording layer side dielectric layer 5 and the dielectric layer 7 are made of $ZrO_2$—$SiO_2$—$Cr_2O_3$. Note that a composition of the dielectric layers 4 and 5 will be described in examples below.

A material of the recording layer 6 can be a phase change material whose main component is Te, In, Se, or the like. Well-known main components of phase change materials include TeGeSb, TeGeSn, TeGeSnAu, SbSe, SbTe, SbSeTe, In—Te, In—Se, In—Se—Tl, InSbInSbSe, GeSbTeAg, and the like. There are material systems that have been commercialized for phase change optical disks or have been studied widely, which include the GeSbTe system, AgGeSbTe system, and the like. In this embodiment, one from the GeSbTe system is used as a main component.

The dielectric layer 50 consisting of the reflection layer side dielectric layer 4 and the recording layer side dielectric layer 5, the dielectric layer 7, the dielectric layer 8, the recording layer 6, the reflection layer 3, the transmittance adjustment layer 2, and the like, are usually formed by an electron-beam evaporation method, a sputtering method, an ion plating method, a CVD method, a laser sputtering method, or the like. In this embodiment, the sputtering method is used.

EXAMPLE 1

An example of a structure of the disk that is used in the above embodiment will be described.

First, as the substrate 1, a substrate was used made of polycarbonate that has a diameter of 120 mm, a thickness of 1.1 mm, and a surface covered with guide grooves with pitch 0.3 μm and depth 20 nm. On the substrate 1 the following layers were formed by a magnetron sputtering method so as to form the first information layer 100. The layers include the transmittance adjustment layer 2 made of titanium oxide having a thickness of 20 nm, the reflection layer 3 made of Ag having a thickness of 10 nm, the dielectric layer 50 consisting of the reflection layer side dielectric layer 4 and the recording layer side dielectric layer 5 made of $ZrO_2$—$SiO_2$—$Cr_2O_3$ having a thickness of 16 nm, the recording layer 6 made of $Ge_{22}Sb_{25}Te_{53}$ (at %) having a thickness of 7 nm, the dielectric layer 7 made of $ZrO_2$—$SiO_2$—$Cr_2O_3$ having a thickness of 10 nm, and the dielectric layer 8 made of ZnS-20 mol % $SiO_2$ having a thickness of 40 nm, in this order. After that, an optically transparent layer (the cover layer 9) having a thickness of 0.1 mm was formed by a spin coating method.

(1) First, composition of the reflection layer side dielectric layer 4 was fixed such that the composition ratio of $ZrO_2$, $SiO_2$ and $Cr_2O_3$ was 30:30:40, and various changes were made to the composition of the recording layer side dielectric layer 5 in order to study the corrosion resistance and transmittance in each composition at a laser wavelength of 405 nm. In the corrosion resistance test, an optical microscope was used to observe a disk after 100 hours elapsed in an environment with a temperature of 90 degrees Celsius and a humidity of 80% to observe the extent of film peeling. In addition, regarding the transmittance, three levels were set including 47% or more, 50% or more and 52% or more. Regarding the single sided double layer optical information recording medium, if the transmittance of the first information layer 100 at the laser incident side is 47% or more, it can be said that sufficient intensity of the laser is obtained for recording information on the second information layer 200 at the deeper side. However, higher transmittance is desirable, and there will not be a problem if a transmittance of 50% or more can be secured. Furthermore, a transmittance of 52% or more is even more desirable because the range of the composition of the second information layer 200 at the deeper side can be enlarged. The result will be described with reference to FIGS. 3 and 4.

Figure 3:
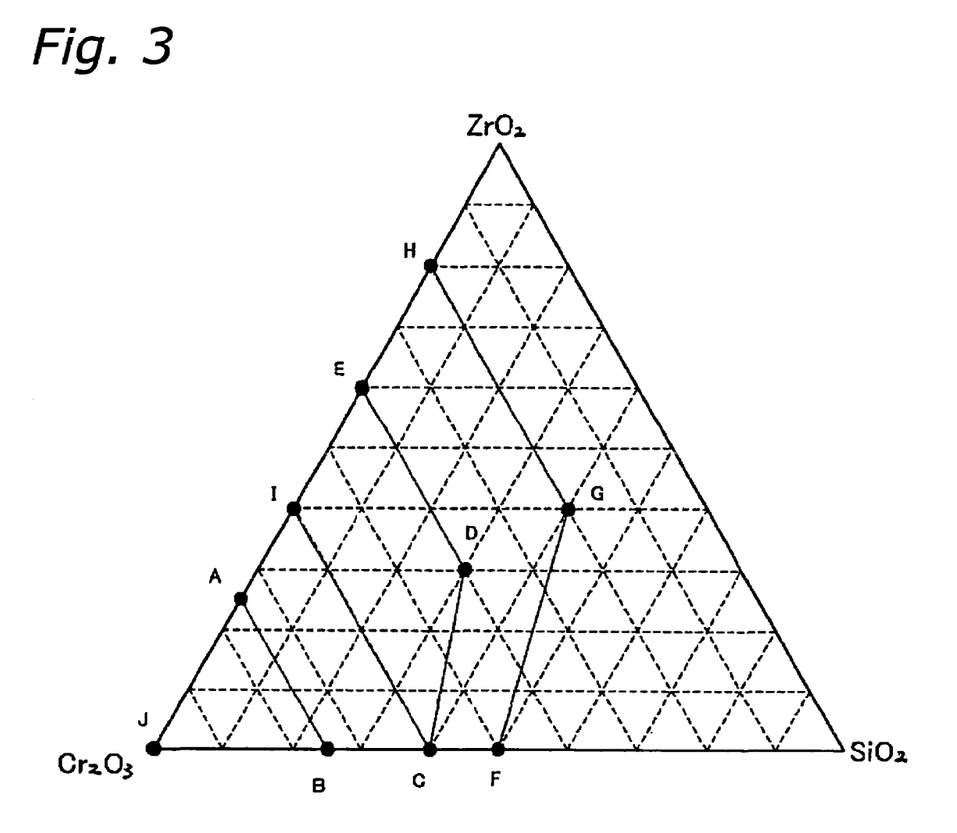
FIG. 3 is a diagram showing a composition of a dielectric layer of the optical disk that is used in the embodiment of the present invention.
Figure 4:
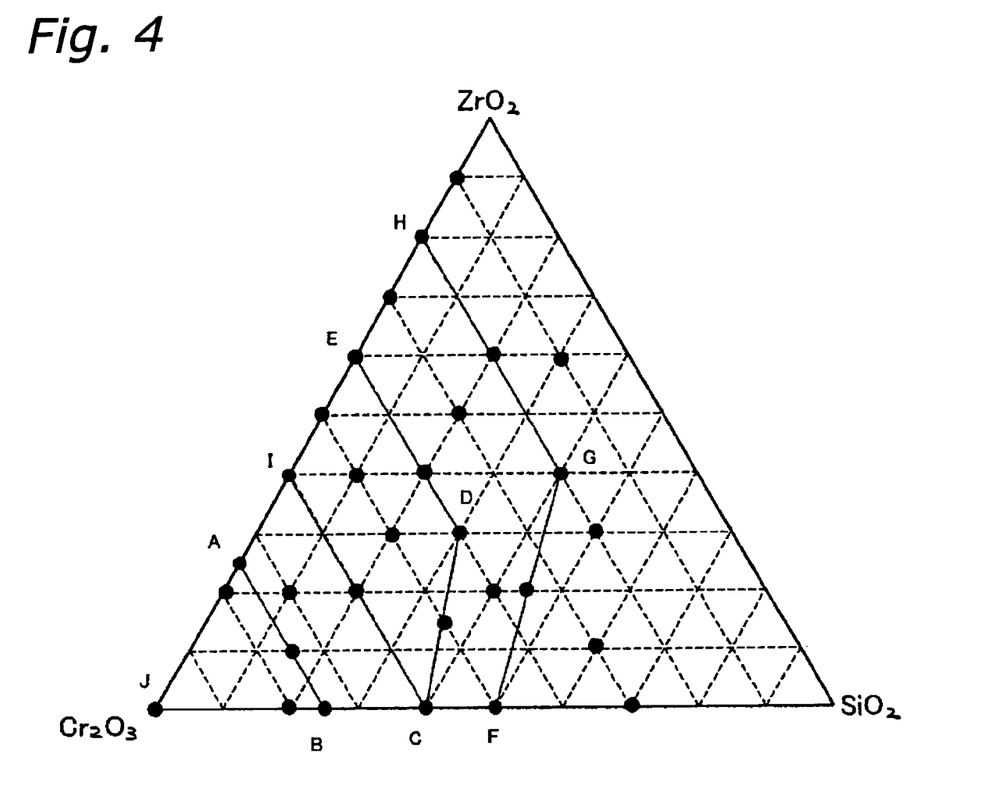
FIG. 4 is a diagram showing a composition of a dielectric layer of the optical disk that is used in the embodiment of the present invention.

The corrosion resistance and the transmittance of 30 sheets of samples of various composition (corresponding to the black points shown in FIG. 4) of the recording layer side dielectric layer 5 were measured. The points A–J shown in FIGS. 3 and 4 are expressed with composition ratios of $ZrO_2$, $SiO_2$ and $Cr_2O_3$ as point A(25:0:75), point B(0:25:75), point C(0:40:60), point D(30:30:40), point E(60:0:40), point F(0:50:50), point G(40:40:20), point H(80:0:20), point I(40:0:60) and point J(0:0:100), using the ratio (mol %) of $ZrO_2$:$SiO_2$:$Cr_2O_3$. These ratios can be converted into composition ratios of Zr, Si and Cr as point A(14:0:86), point B(0:14:86), point C(0:25:75), point D(21:21:58), point E(43:0:57), point F(0:33:67), point G(33:33:34), point H(67:0:33), point I(25:0:75) and point J(0:0:100), using the ratio (at %) of Zr:Si:Cr.

The result of the corrosion resistance test will be described with reference to FIG. 3. The peeling did not occur after the humidity resistance test in the case where the composition of the recording layer side dielectric layer 5 was in the range defined by point J, point C, point D, point E and point J in this order. However, the peeling occurred in other compositions. It is thought that this peeling primarily occurs at the interface between the recording layer 6 and the recording layer side dielectric layer 5. However, it is thought that that the peeling also occurs at the interface between the reflection layer 3 and the reflection layer side dielectric layer 4 if the amount of $Cr_2O_3$ is very low or the amount of $SiO_2$ is very high in the reflection layer side dielectric layer 4. It is found from these results that corrosion resistance can be improved by increasing the amount of $Cr_2O_3$ or decreasing the amount of $SiO_2$.

Next, the result of the transmittance test will be described with reference to FIG. 3. The transmittance was less than 47% when in the range defined by point A, point B, point J and point A in this order. The transmittance was 47% or more in all other ranges and thus considered to be good. Furthermore, the transmittance was less than 50% when in the range defined by point J, point C, point I and point J in this order. The transmittance was 50% or more in all other ranges and thus considered to be even better. It is found from these results that the transmittance can be improved by decreasing the amount of $Cr_2O_3$.

It is found from above-mentioned results that both the corrosion resistance and the transmittance are good in the case where the composition of the recording layer side dielectric layer 5 is in the range defined by point A, point B, point C, point D, point E and point A in this order. In addition, the transmittance can be further improved in the case where the composition of the recording layer side dielectric layer 5 is in the range defined by point I, point C, point D, point E and point I in this order.

(2) Composition of the recording layer side dielectric layer 5 was fixed, and composition of the reflection layer side dielectric layer 4 was changed for studying corrosion resistance and transmittance.

The composition of the recording layer side dielectric layer 5 was fixed such that the composition ratio of $ZrO_2$, $SiO_2$ and $Cr_2O_3$ was 25:0:75, and various changes were made to the composition of the reflection layer side dielectric layer 4. The rest of the disk structure was set to the same as the above example. The corrosion resistance and the transmittance of 30 sheets of samples were measured, whose composition of the reflection layer side dielectric layer 4 are represented by the points shown in FIG. 4.

The result of the corrosion resistance test will be described with reference to FIG. 3. The peeling did not occur after the humidity resistance test in the case where the composition of the reflection layer side dielectric layer 4 was in the range defined by point J, point F, point G, point H and point J in this order, while the peeling occurred in other compositions.

Next, the result of the transmittance will be described with reference to FIG. 3. The transmittance was less than 47% when in the range defined by point J, point B, point A and point J in this order. In addition, the transmittance was less than 52% when in the range defined by point J, point C, point I and point J in this order.

(3) Next, composition of the recording layer side dielectric layer 5 was fixed such that the composition ratio of $ZrO_2$, $SiO_2$ and $Cr_2O_3$ was 60:0:40, and various changes were made to the composition of the reflection layer side dielectric layer 4.

The result of the corrosion resistance will be described with reference to FIG. 3. The peeling did not occur after the humidity resistance test in the case where the composition of the reflection layer side dielectric layer 4 was in the range defined by point J, point F, point G, point H and point J in this order, while the peeling occurred in other compositions.

Next, the result of the transmittance will be described with reference to FIG. 3. The transmittance was less than 50% when in the range defined by point J, point B, point A and point J in this order. In addition, the transmittance was less than 52% when in the range defined by point J, point C, point I and point J in this order.

It is found from above-mentioned results that both the corrosion resistance and the transmittance are good in the case where the composition of the reflection layer side dielectric layer 4 is in the range defined by point I, point C, point F, point G, point H and point I in this order.

Needless to say, it is even better to increase the transmittance to be above 52%. This is the case where the composition of the reflection layer side dielectric layer 4 is in the range defined by point C, point F, point G, point H, point E, point D and point C in this order, considering the corrosion resistance.

(4) Summary

Thus, when comparing characteristics of each composition of the reflection layer side dielectric layer 4 and the recording layer side dielectric layer 5, it was confirmed that there is a higher margin of corrosion resistance in the reflection layer side dielectric layer 4 than in the dielectric layer 5. Therefore, considering that $Cr_2O_3$ is necessary for securing corrosion resistance, it is desirable to set the amount of $Cr_2O_3$ in the recording layer side dielectric layer 5 to be higher than in the reflection layer side dielectric layer 4. Alternatively, it is desirable to set the amount of $SiO_2$ in the recording layer side dielectric layer 5 to be lower than the reflection layer side dielectric layer 4.

Regarding the transmittance, it is desirable that the amount of $Cr_2O_3$ is low in either or both the reflection layer side dielectric layer 4 and the recording layer side dielectric layer 5.

Therefore, considering the above-mentioned comparison result for the corrosion resistance and the transmittance, in order to improve the corrosion resistance and to suppress the reduction in the transmittance as much as possible, the composition range of $Cr_2O_3$ should be selected to be higher in the reflection layer side dielectric layer 4 than in the recording layer side dielectric layer 5. In addition, the amount of $SiO_2$ has no relationship with the transmittance, but has a strong influence on the corrosion resistance. Therefore, it is thought that the composition range should be selected so that the amount of $SiO_2$ is lower in the recording layer side dielectric layer 5 which has a smaller composition margin than in the reflection layer side dielectric layer 4.

Note that although only the results of the case where $ZrO_2$—$SiO_2$—$Cr_2O_3$ sputtering target are used in this embodiment, the same results are obtained in the case when ZnS, ZnSe, ZnO, and the like, are added.

In addition, although only the case where the dielectric layer 50 has double layers including the recording layer side dielectric layer 5 and the reflection layer side dielectric layer 4 is described in the above-mentioned example, the dielectric layer 50 may have three or more layers including the above-mentioned two layers plus other layers.

In addition, the dielectric layer 50 may have a structure in which it is difficult to clearly distinguish the layers in the interior thereof. Namely, the inside can be a single layer whose composition changes gradually from the recording layer 6 side to the reflection layer 3 side. For example, as the dielectric layer 50 having this single layer structure, it is possible to make the composition ratio of $Cr_2O_3$ in the vicinity of the interface with the recording layer 6 higher than the composition ratio of $Cr_2O_3$ at the reflection layer 3 side. Alternatively, it is possible to make the composition ratio of $SiO_2$ in the vicinity of the interface with the recording layer 6 higher than the composition ratio of $SiO_2$ at the reflection layer 3 side. Thus, if the dielectric layer 50 is a single layer, the above-mentioned optimal condition of the recording layer side dielectric layer 5 may be adapted for the composition of the single layer near the interface with the recording layer 6, and the above-mentioned optimal condition of the reflection layer side dielectric layer 4 may be adapted for the composition of the single layer at the reflection layer 3 side. Note that, the layer in which the composition changes gradually, as described above, can be formed by sputtering while changing the composition of the sputtering target.

EXAMPLE 2

(1) Composition of the reflection layer side dielectric layer 4 was fixed, while composition of the recording layer side dielectric layer 5 was changed. The results of a study in which corrosion resistance and transmittance of the recording layer side dielectric layer 5 were examined will be described below. In this study, as shown in Table 1 below, the composition of the reflection layer side dielectric layer 4 was constant at $ZrO_2:SiO_2:Cr_2O_3=50:20:30$, and only the composition of the recording layer side dielectric layer 5 was changed. The rest of the disk structure and the like were the same as in example 1.

TABLE 1

The amount of $Cr_2O_3$ in the recording layer side dielectric layer, corrosion resistance and transmittance

| Sample No. | $ZrO_2$ (mol %) | $SiO_2$ (mol %) | $Cr_2O_3$ (mol %) | Corrosion resistance | Transmittance |
|---|---|---|---|---|---|
| 1 | 10 | 20 | 70 | better | 50% |
| 2 | 30 | 20 | 50 | good | 52% |
| 3 | 50 | 20 | 30 | no good | 54% |

It is understood from Table 1 that the higher the amount of $Cr_2O_3$ in the recording layer side dielectric layer 5, the more the corrosion resistance is improved. In addition, in the case where the composition ratio of $Cr_2O_3$ is 50%, corrosion of films was not found even after 100 hours in an environment with a temperature of 90 degrees Celsius and a humidity of 80%. In the case where the composition ratio of $Cr_2O_3$ is 70%, corrosion of films was not found even after 300 hours. Though the transmittance decreases as the composition ratio of $Cr_2O_3$ increases, a transmittance of 50% or more was secured, and thus was not a problem. It is confirmed also from this result that the corrosion resistance can be improved if the amount of $Cr_2O_3$ is higher in the recording layer side dielectric layer 5 than in the dielectric layer 4.

(2) The composition of the reflection layer side dielectric layer 4 was set to a value different from the composition in the above example, while the composition of the recording layer side dielectric layer 5 was changed. Results of a study in which corrosion resistance and transmittance of the recording layer side dielectric layer 5 were examined will be described below. In this study, as shown in Table 2 below, the composition of the reflection layer side dielectric layer 4 was constant at $ZrO_2:SiO_2:Cr_2O_3=30:20:50$, and only the composition of the recording layer side dielectric layer 5 was changed. The rest of the disk structure and the like were the same as in example 1.

TABLE 2

The amount of $SiO_3$ in the recording layer side dielectric layer, corrosion resistance and transmittance

| Sample No. | $ZrO_2$ (mol %) | $SiO_2$ (mol %) | $Cr_2O_3$ (mol %) | Corrosion resistance | Transmittance |
|---|---|---|---|---|---|
| 1 | 0 | 50 | 50 | good | 54% |
| 2 | 30 | 20 | 50 | good | 52% |
| 3 | 50 | 0 | 50 | better | 52% |

It is understood from Table 2 that the lower the amount of $SiO_2$ in the recording layer side dielectric layer 5, the more the corrosion resistance is improved. In addition, in the case where the composition ratio of $SiO_2$ is 50% or 20%, corrosion of films was not found even after 100 hours in an environment with a temperature of 90 degrees Celsius and a humidity of 80%. In the case where the composition ratio of $SiO_2$ is 0%, corrosion of films was not found even after 300 hours. In all of the ranges of the composition ratio of $SiO_2$ that were studied, the transmittance was always 52% or more, and thus were good ranges. It is confirmed also from this result that the corrosion resistance can be improved if the amount of $SiO_2$ is higher in the recording layer side dielectric layer 5 than in the reflection layer side dielectric layer 4.

According to the present invention, corrosion resistance (reliability) when recording information optically can be secured, and good transmittance can be secured. Therefore the present invention is useful particularly in applications to single sided double layer information recording media that have good recording and reproducing characteristics.

The invention claimed is:

1. An optical information recording medium, comprising at least two information layers on a substrate;
   wherein the information layer disposed at a laser incident side includes at least a reflection layer, a recording layer disposed at the laser incident side with respect to the reflection layer that serves to generate a reversible change between an amorphous phase and a crystalline phase that can be detected optically by applying a laser beam, and a dielectric layer disposed between the reflection layer and the recording layer;
   the dielectric layer contains at least Zr, Si and Cr;
   a ratio of Zr, Si and Cr of the dielectric layer at the reflection layer side is expressed as Zr:Si:Cr=p:q:r (p+q+r=100, and p, q, r are in at %);
   a ratio of Zr, Si and Cr of the dielectric layer in the vicinity of the interface at the recording layer side is expressed as Zr:Si:Cr=s:t:u (s+t+u=100, and s, t and u are in at %); and
   r is less than u.

2. An optical information recording medium, comprising at least two information layers on a substrate;
   wherein the information layer disposed at a laser incident side includes at least a reflection layer, a recording layer disposed at the laser incident side with respect to the reflection layer that serves to generate a reversible change between an amorphous phase and a crystalline phase that can be detected optically by applying a laser beam, and a dielectric layer disposed between the reflection layer and the recording layer;
   a ratio of Zr, Si and Cr of the dielectric layer at the reflection layer side is expressed as Zr:Si:Cr=p:q:r where p+q+r=100, and p, q, r are in at %;
   a ratio of Zr, Si and Cr of the dielectric layer in the vicinity of the interface at the recording layer side is expressed as Zr:Si:Cr=s:t:u where s+t+u=100, and s, t and u are in at %; and
   q is larger than t.

3. The optical information recording medium according to claim 2, wherein r is less than u.

4. The optical information recording medium according to claim 1, wherein, when a ratio of Zr, Si and Cr (p+q+r=100, and p, q and r are in at %), (s+t+u=100, s, t and u are in at %) is defined by point A(14:0:86), point B(0:14:86), point C(0:25:75), point D(21:21:58), point E(43:0:57), point F(0:33:67), point G:(33:33:34), point H(67:0:33) and point I(25:0:75),
   the ratio of Zr, Si, Cr in the dielectric layer in the vicinity of the interface at the recording layer side is in the range defined by point A, point B, point C, point D, point E and point A in this order, and the ratio of Zr, Si and Cr of the dielectric layer at the reflection layer side is in the range defined by point C, point F, point G, point H, point I and point C in this order.

5. The optical information recording medium according to claim 4, wherein the ratio of Zr, Si and Cr in the dielectric layer at the reflection layer side is in the range defined by point C, point F, point G, point H, point E, point D and point C in this order.

6. An optical information recording medium comprising at least two information layers on a substrate;
   wherein the information layer disposed at a laser incident side including at least a reflection layer, a recording layer disposed at the laser incident side with respect to the reflection layer that serves to generate a reversible change between an amorphous phase and a crystalline phase that can be detected optically by applying a laser beam, and a dielectric layer disposed between the reflection layer and the recording layer; the dielectric layer contains at least Zr, Si and Cr;
   a ratio of Zr, Si and Cr in the dielectric layer at the reflection layer side is expressed as Zr:Si:Cr=p:q:r (p+q+r=100, and p, q, r are in at %);
   a ratio of Zr, Si and Cr in the dielectric layer in the vicinity of the interface at the recording layer side is expressed as Zr:Si:Cr=s:t:u (s+t+u=100, and s, t and u are in at %); and
   when a ratio of Zr, Si and Cr (p+q+r=100, and p, q and r are in at %), (s+t+u=100, s, t and u are in at %) is defined by point A(14:0:86), point B(0:14:86), point C(0:25:75), point D(21:21:58), point E(43:0:57), point F(0:33:67), point G(33:33:34), point H(67:0:33) and point I(25:0:75),
   the ratio of Zr, Si, Cr in the dielectric layer in the vicinity of the interface at the recording layer side is in the range defined by point A, point B, point C, point D, point E and point A in this order, and the ratio of Zr, Si and Cr of the dielectric layer at the reflection layer side is in the range defined by point C, point F, point G, point H, point I and point C in this order.

7. The optical information recording medium according to claim 6, wherein the ratio of Zr, Si and Cr in the dielectric layer at the reflection layer side is in the range defined by point C, point F, point G, point H, point E, point D and point C in this order.

8. The optical information recording medium according to claim 1, wherein the dielectric layer has at least two layers including a recording layer side dielectric layer disposed in the vicinity of the recording layer and a reflection layer side dielectric layer that is closer to the reflection layer than the recording layer side dielectric layer;
the reflection layer side dielectric layer contains at least Zr, Si and Cr, whose ratio is expressed as Zr:Si:Cr=p:q:r (p+q+r=100, and p, q and r are in at %); and
the recording layer side dielectric layer contains at least Zr, Si and Cr, whose ratio is expressed as Zr:Si:Cr=s:t:u (s+t+u=100, and s, t and u are in at %).

9. The optical information recording medium according to claim 8, wherein the thickness of the recording layer side dielectric layer is between $1/15^{th}$ and $1/3$rd of the thickness of the reflection layer side dielectric layer.

10. The optical information recording medium according to claim 8, wherein the thickness of the recording layer side dielectric layer is more than or equal to 1 nm and less than or equal to 8 nm.

11. The optical information recording medium according to claim 1, wherein the dielectric layer contains at least $ZrO_2$, $SiO_2$ and $Cr_2O_3$.

12. A method for manufacturing an optical information recording medium having at least two information layers on a substrate, the method forming an information layer that is disposed at a laser incident side, the method comprising the steps of:
forming at least a reflection layer;
forming a recording layer at the laser incident side with respect to the reflection layer for generating a reversible change between an amorphous phase and a crystalline phase that can be detected optically by applying a laser beam; and
forming a dielectric layer between the reflection layer and the recording layer;
wherein the step of forming the dielectric layer includes forming at least two layers including a recording layer side dielectric layer having a portion that contacts with the recording layer and a reflection layer side dielectric layer that is closer to the reflection layer than the recording layer side dielectric layer;
the reflection layer side dielectric layer contains at least Zr, Si and Cr, whose ratio is expressed as Zr: Si:Cr=p:q:r (p+q+r=100, and p, q and r are in at %);
the recording layer side dielectric layer contains at least Zr, Si and Cr, whose ratio is expressed as Zr:Si:Cr=s:t:u (s+t+u=100, and s, t and u are in at %), and
a sputtering target that satisfies r<u is used.

13. A method for manufacturing an optical information recording medium having at least two information layers on a substrate, the method forming an information layer that is disposed at a laser incident side, the method comprising:
forming at least a reflection layer;
forming a recording layer at the laser incident side with respect to the reflection layer for generating a reversible change between an amorphous phase and a crystalline phase that can be detected optically by applying a laser beam; and
forming a dielectric layer between the reflection layer and the recording layer,
wherein the step of forming the dielectric layer includes forming at least two layers including a recording layer side dielectric layer having a portion that contacts with the recording layer and a reflection layer side dielectric layer that is closer to the reflection layer than the recording layer side dielectric layer;
the reflection layer side dielectric layer contains at least Zr, Si and Cr, whose ratio is expressed as Zr:Si:Cr=p:q:r (p+q+r=100, and p, q and r are in at %);
the recording layer side dielectric layer contains at least Zr, Si and Cr, whose ratio is expressed as Zr:Si:Cr=s:t:u (s+t+u=100, and s, t and u are in at %); and
a sputtering target that satisfies q>t is used.

14. The method for manufacturing an optical information recording medium according to claim 13, wherein a sputtering target that satisfies r<u is used.

15. The method for manufacturing an optical information recording medium according to claim 12, wherein a sputtering target material is used so that,
when a ratio of Zr, Si and Cr (p+q+r=100, and p, q and r are in at %), (s+t+u=100, s, t and u are in at %) is defined by point A(14:0:86), point B(0:14:86), point C(0:25:75), point D(21:21:58), point E(43:0:57), point F(0:33:67), point G:(33:33:34), point H(67:0:33) and point I(25:0:75),
in the step of forming the dielectric layer, the ratio of Zr, Si and Cr in the recording layer side dielectric layer is in the range defined by point A, point B, point C, point D, point E and point A in this order, and the ratio of Zr, Si and Cr in the reflection layer side dielectric layer is in the range defined by point C, point F, point G, point H, point I and point C in this order.

16. The method for manufacturing an optical information recording medium according to claim 15, wherein a sputtering target material is used so that the ratio of Zr, Si and Cr in the reflection layer side dielectric layer is in the range defined by point C, point F, point G, point H, point E, point D and point C in this order.

17. A method for manufacturing an optical information recording medium having at least two information layers on a substrate, the method forming an information layer that is disposed at a laser incident side, the method comprising:
forming at least a reflection layer;
forming a recording layer at the laser incident side with respect to the reflection layer for generating a reversible change between an amorphous phase and a crystalline phase that can be detected optically by applying a laser beam; and
forming a dielectric layer between the reflection layer and the recording layer,
wherein the step of forming the dielectric layer includes forming at least two layers including a recording layer side dielectric layer having a portion that contacts with the recording layer and a reflection layer side dielectric layer that is closer to the reflection layer than the recording layer side dielectric layer;
the reflection layer side dielectric layer contains at least Zr, Si and Cr, whose ratio is expressed as Zr:Si:Cr=p:q:r (p+q+r=100, and p, q and r are in at %);
the recording layer side dielectric layer contains at least Zr, Si and Cr, whose ratio is expressed as Zr:Si:Cr=s:t:u (s+t+u=100, and s, t and u are in at %); and
a sputtering target material is used so that,
when a ratio of Zr, Si and Cr (p+q+r=100, and p, q and r are in at %), (s+t+u=100, s, t and u are in at %) is defined by point A(14:0:86), point B(0:14:86), point C(0:25:75), point D(21:21:58), point E(43:0:57), point F(0:33:67), point G:(33:33:34), point H(67:0:33) and point I(25:0:75), in the step of forming the dielectric layer, the ratio of Zr, Si and Cr in the recording layer side dielectric layer is in the range defined by point A, point B, point C, point D, point E and point A in this order, and the ratio of Zr, Si and Cr in the reflection layer side dielectric layer is in the range defined by point C, point F, point G, point H, point I and point C in this order.

18. The method for manufacturing an optical information recording medium according to claim 17, wherein a sputtering target material is used so that the ratio of Zr, Si and Cr in the reflection layer side dielectric layer is in the range defined by point C, point F, point G, point H, point E, point D and point C in this order.

19. The method for manufacturing an optical information recording medium according to claim 12, wherein the sputtering target contains at least $Zr_2$, $SiO_2$ and $Cr_2O_3$.

* * * * *

UNITED STATES PATENT AND TRADEMARK OFFICE
CERTIFICATE OF CORRECTION

PATENT NO. : 7,014,904 B2
APPLICATION NO. : 10/847440
DATED : March 21, 2006
INVENTOR(S) : Yoshitaka Sakaue et al.

It is certified that error appears in the above-identified patent and that said Letters Patent is hereby corrected as shown below:

In Column 12, Line 56, Claim 6, change "rare" to --r are--.

In Column 15, Line 3, Claim 17, change "1" to --I--.

Signed and Sealed this

Twenty-eighth Day of November, 2006

JON W. DUDAS
*Director of the United States Patent and Trademark Office*